（12）United States Patent
Yeh et al.

(10) Patent No.: US 8,509,336 B2
(45) Date of Patent: Aug. 13, 2013

(54) TRANSMITTING/RECEIVING METHOD FOR MULTI-USER MULTIPLE-INPUT MULTIPLE-OUTPUT SYSTEM

(75) Inventors: Choong il Yeh, Daejeon (KR); In-Kyeong Choi, Daejeon (KR); Young Seog Song, Daejeon (KR); Seung Joon Lee, Daejeon (KR); Byung-Jae Kwak, Seoul (KR); Ji Hyung Kim, Daejeon (KR); Dong Seung Kwon, Daejeon (KR); Joon Doo Kim, Seoul (KR); Ji Won Kang, Incheon (KR); Chung Yong Lee, Seoul (KR)

(73) Assignees: Samsung Electronics Co., Ltd., Suwon-si (KR); Electronics & Telecommunications Research Institute, Daejeon (KR)

( * ) Notice: Subject to any disclaimer, the term of this patent is extended or adjusted under 35 U.S.C. 154(b) by 599 days.

(21) Appl. No.: 12/740,896

(22) PCT Filed: Jun. 24, 2008

(86) PCT No.: PCT/KR2008/003603
§ 371 (c)(1),
(2), (4) Date: Apr. 30, 2010

(87) PCT Pub. No.: WO2009/057876
PCT Pub. Date: May 7, 2009

(65) Prior Publication Data
US 2010/0310001 A1 Dec. 9, 2010

(30) Foreign Application Priority Data
Oct. 31, 2007 (KR) .......... 10-2007-0110110
Dec. 13, 2007 (KR) .......... 10-2007-0130387

(51) Int. Cl.
*H04L 1/02* (2006.01)

(52) U.S. Cl.
USPC .............. 375/267; 375/260; 375/259

(58) Field of Classification Search
USPC .......................... 375/267, 260, 259
See application file for complete search history.

(56) References Cited

U.S. PATENT DOCUMENTS 7,068,981 B2   6/2006   Sim
7,280,625 B2   10/2007  Ketchum et al.

(Continued)

FOREIGN PATENT DOCUMENTS

| KR | 10-2003-0075883 A | 9/2003 |
| KR | 10-2003-0075885 A | 9/2003 |
| KR | 10-0464014 B1 | 12/2004 |
| KR | 10-2005-0015730 A | 2/2005 |
| KR | 10-2005-0065499 A | 6/2005 |
| KR | 10-2005-0082153 A | 8/2005 |
| KR | 10-2006-0108450 A | 10/2006 |
| KR | 10-0678167 B1 | 1/2007 |

OTHER PUBLICATIONS

J.Liu et al., Improved Tomlinson-Harashima Precoding for the Downlink of Multiple Antenna Multi-User Systems, Wireless Communications and Networking Conference 2005. IEEE, Mar. 2005, pp. 466-472, vol. 1.

(Continued)

*Primary Examiner* — Kenneth Lam
*Assistant Examiner* — Michael Neff
(74) *Attorney, Agent, or Firm* — Jefferson IP Law, LLP

(57) ABSTRACT

Disclosed is a transmitting/receiving method in a multi-user multiple-input multiple-output (MU-MIMO) channel. The transmitting method includes: performing QR decomposition on a Hermitian transpose matrix of a channel matrix to obtain a first matrix and a second matrix as a triangular matrix; obtaining a preprocessing matrix by using the first matrix; and forming an effective channel based on the preprocessing matrix by a block triangulation technique.

11 Claims, 7 Drawing Sheets

(56) References Cited

U.S. PATENT DOCUMENTS

| | | | |
|---|---|---|---|
| 7,463,601 | B2 | 12/2008 | Lee et al. |
| 2004/0165684 | A1* | 8/2004 | Ketchum et al. .............. 375/343 |
| 2005/0192019 | A1 | 9/2005 | Kim et al. |
| 2005/0276362 | A1* | 12/2005 | Yu et al. ......................... 375/347 |
| 2006/0251061 | A1 | 11/2006 | Kim et al. |
| 2007/0015543 | A1* | 1/2007 | Ojard ......................... 455/562.1 |
| 2009/0175375 | A1* | 7/2009 | Zhang ............................ 375/267 |

OTHER PUBLICATIONS

Veljko Stankovic et al., Successive Optimization Tomlinson-Harashima Precoding (SO THP) for Multi-User MIMO Systems, IEEE transactions on ICASSP, Jun. 2005, pp. 1277-1294, vol. 48, No. 6.

Jia Liu et al., A Null Space Constraint Based Block Tomlinson-Harashima Precoding Technique for the Multi-User MIMO Downlink, IEEE transactions on Wireless Communications, Nov. 2005, pp. 2683-2687, vol. 4, No. 6.

Joon-Doo Kim et al., Improved Block Tomlinson-Harashima Precoding for the Downlink Multiuser MIMO Systems, 2007 IEEK (the Institute of Electronic Engineers of Korea) Autumn Conference, Nov. 24, 2007.

Joon-Do Kim et al., An Improved Block Tomlinson-Harashima Precoder for Multi-User MIMO Systems, 23rd International Technical Conference on Circuits/Systems, Computers and Communications (ITC-SCSS 2008), Jul. 6-9, 2008.

* cited by examiner

TRANSMITTING/RECEIVING METHOD FOR MULTI-USER MULTIPLE-INPUT MULTIPLE-OUTPUT SYSTEM

TECHNICAL FIELD

The present invention relates to a transmitting/receiving method for a MU-MIMO (multi-user multiple-input multiple-output) channel, and in particular, to a transmitting/receiving method for a block Tomlinson-Harashima precoder (hereinafter referred to as "BTHP") in a downlink MU-MIMO channel.

BACKGROUND ART

A Tomlinson-Harashima precoder (hereinafter referred to as "THP") is a representative nonlinear multiple-user multiple-input single-output (MU-MISO) system, and BTHP is an expansion of the THP to a system in which a user uses a multiple-antenna.

Zero forcing (ZF)-THP is a method in which a transmitting end removes incoming interference from a signal to be transmitted to a triangulated effective channel, which is formed by a generalized decision feedback equalizer (GDFE) or QR decomposition, based on information about all channels of the multiple users in advance, and constrains improvement of transmission power by a modulo operation.

When a user uses a multiple-antenna, THP is expanded by performing block triangulation of a multi-user channel and removing interference in a vector unit based on successive optimization (hereinafter referred to as "SO"). The expansion of THP includes SO-THP and null space constraint based (NS)-BTHP.

SO-THP performs block triangulation based on SO. In SO-THP, interference is removed in a symbol unit while taking the effect of a receiving end into consideration, in addition to the transmitting end. Meanwhile, in NS-BTHP, interference is removed in a vector unit while only taking the transmitting end into consideration. The NS technique of NS-BTHP is the same as SO, and thus NS-BTHP is simply called BTHP.

FIG. 1 is a schematic diagram of NS-BTHP. If a base station has $N_T$ antennas and each of K users has $N_R$ antennas, the channel matrix H 107 of all the users is formed in a shape in which the channel matrixes of the individual users are stacked from the top in a descending order of priority. The channel matrix H 107 of all the users is as expressed by Equation 1.

$$H = [H_1^T H_2^T \ldots H_K^T]^T \quad \text{(Equation 1)}$$

A preprocessing matrix F 105 for block triangulation of the effective channel is as expressed by Equation 2.

$$F = [F_1 F_2 \ldots F_K] \quad \text{(Equation 2)}$$

Here, $F_k$ is a matrix that preprocesses data ã 117 of the k-th user and is orthogonal to the channel space of a user having high priority. In order to obtain a matrix that is orthogonal to the channel space of the user having high priority, singular value decomposition (hereinafter referred to as "SVD") is performed on the channel matrix H 107 of the user, as expressed by Equation 3.

$$\tilde{H}_k = [H_1^T \ldots H_{k-1}^T]^T \quad \text{(Equation 3)}$$

$$= \tilde{U}_k \tilde{\Sigma}_k [\tilde{V}_k^{(1)} \quad \tilde{V}_k^{(0)}]^H$$

Here,
$\tilde{V}_k^{(0)}$
includes
$N_T$-rank ($\tilde{H}_k$)
column vectors constituting the zero space of
$\tilde{H}_k$,
and it may be used as the preprocessing matrix of the k-th user.

In order to match actual transmitted data to received data, it is necessary to form an effective matrix in a square. To this end, SVD is performed on the channel matrix H 107 of the k-th user and the matrix orthogonal to the channel space of the previous user, as expressed by Equation 4.

$$H_k \tilde{V}_k^{(0)} = U_k \Sigma_k [V_k^{(1)} V_k^{(0)}]^H \quad \text{(Equation 4)}$$

$V_k^{(1)}$ includes rank ($H_k \tilde{V}_k^{(0)}$) column vectors constituting the signal space of $H_k \tilde{V}_k^{(0)}$. With this, the effective channel matrix H 107 of the k-th user can be formed in a square. Finally, the preprocessing matrix F 105 of the k-th user is formed as expressed by Equation 5.

$$F_k = \tilde{V}_k^{(0)} V_k^{(1)} \quad \text{(Equation 5)}$$

If the above-described process is performed for all the users, the entire preprocessing matrix F 105 can be constructed, and a block triangular channel HF for removing interference is formed through BTHP. When the data vector a 115 of the k-th user is $a_k$, an interference signal B-1 103 is subtracted from the data vector $a_k$ in advance, and a transmission vector ã 117 is formed with transmission power constraint through a MODulo (MOD) operation 101. The transmission vector ã 117 is as expressed by Equation 6.

$$\tilde{a}_k = \left( a_k - (H_k F_k)^{-1} \sum_{i=1}^{k-1} H_k F_i \tilde{a}_i \right)_{mod} \quad \text{(Equation 6)}$$

Then, the user can receive signals $r_1$ through $r_k$ 111 with no interference, and can restore data $\hat{a}_1$ through $\hat{a}_k$ 113 by multiplying the received signal $r_1$ through $r_k$ 111 by an inverse matrix of his/her effective multiple-input multiple-output channel matrix $H_1^{eff-1}$ through $H_k^{eff-1}$, and performing the MOD operation 101.

In the case of ZF-THP, since each user has a single antenna, it is difficult to obtain a high data rate. Meanwhile, in the case of SO-THP and BTHP, data can be simultaneously transmitted by the number of receiving antennas of each user. However, in SO-THP, for each user, several single-input single-output channels are formed from the beginning, and thus there is no room to obtain spatial diversity. In addition, in BTHP, a ZF receiving technique may be only used due to the modulo operator used in the THP technique. For this reason, despite an equivalent multiple-input multiple-output channel being formed for each user, an expected spatial diversity effect may not be obtained. Consequently, there is a problem in that SO-THP and BTHP are inferior to the ZF-THP technique, which forms a single-input single-output channel, in view of error performance.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a transmitting/receiving method in a multi-user multiple-input multiple-output channel, having an advantage of obtaining a high data rate and spatial diversity, thereby realizing excellent error performance.

Technical Solution

An exemplary embodiment of the present invention provides a transmitting method including: performing QR decomposition on a Hermitian transpose matrix of a channel matrix to obtain a first matrix and a second matrix as a triangular matrix; obtaining a preprocessing matrix by using the first matrix; and forming an effective channel based on the preprocessing matrix by a block triangulation technique.

Another embodiment of the present invention provides a receiving method including: receiving a received signal vector; inversely transforming the received signal vector by using an inverse matrix of a channel matrix; selecting a candidate signal group based on a constellation in which the inversely transformed received signal vector exists; and finding a transmission signal vector closest to the received signal vector from the candidate signal group.

Advantageous Effects

As described above, according to the embodiments of the present invention, it is possible to support a user having a multiple-antenna, thereby obtaining a high data rate. In addition, by applying a receiver from a maximum likelihood (ML) point of view, all the spatial diversity gains by the multiple-antenna can be obtained, thereby improving the error performance.

MODE FOR THE INVENTION

Figure 1:
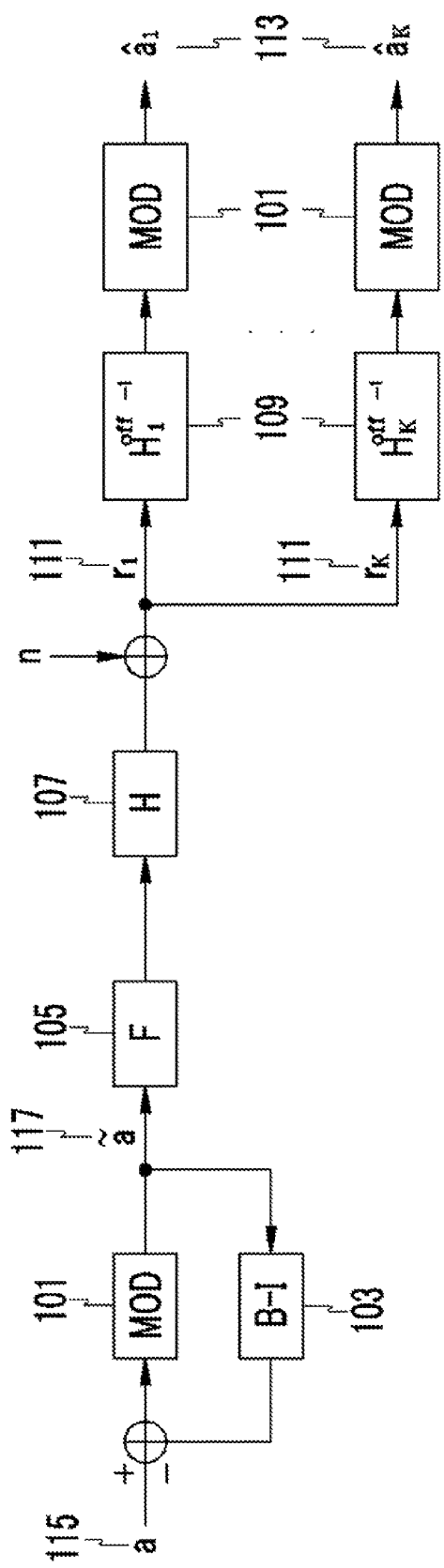
FIG. 1 is a schematic diagram of NS-BTHP.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements. In addition, the terms "-er", "-or", "unit", and "module" described in the specification mean units for processing at least one function and operation and can be implemented by hardware components or software components and combinations thereof.

A BTHP system using an existing SO technique only uses a ZF receiver despite each user having a multiple-antenna, and it cannot obtain a spatial diversity gain. The present invention has been finalized in order to overcome this drawback. A transmitting/receiving method according to an exemplary embodiment of the present invention obtains a spatial diversity gain by an ML receiving technique suitable for a BTHP system and a new block triangulation technique constituting an effective channel from an ML point of view. Therefore, the transmitting/receiving method according to the embodiment of the present invention has excellent error performance, compared with the existing SO-based BTHP.

Figure 2:
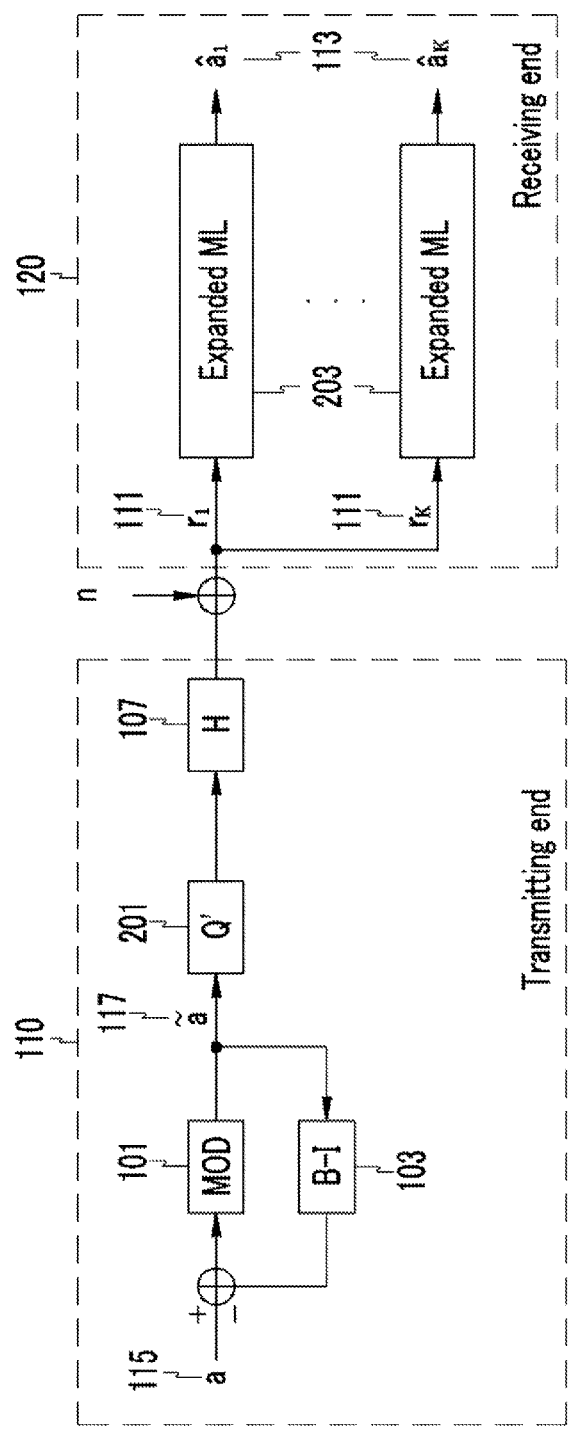
FIG. 2 is a schematic diagram illustrating a transmitting/receiving apparatus according to an embodiment of the present invention.

First, a transmitting/receiving apparatus according to an exemplary embodiment of the present invention will be described with reference to FIG. 2. FIG. 2 is a schematic diagram illustrating a transmitting/receiving apparatus according to an embodiment of the present invention. A transmitting/receiving apparatus according to the embodiment of the present invention includes a transmitting end 110 and a receiving end 120.

The transmitting end 110 performs block triangulation of an effective channel by using a triangulation method of the transmitting/receiving method according to the embodiment of the present invention, rather than the SO technique according to the related art. With the triangulation method of the transmitting/receiving method according to the embodiment of the present invention, a spatial diversity gain of an ML receiving technique that cannot be obtained by the SO technique according to the related art can be obtained. The transmitting end 110 transmits a transmission signal that is preprocessed through an effective channel matrix Q' 201, which is formed by the block triangulation method of the transmitting/receiving method according to the embodiment of the present invention. Then, each user can receive a signal from which multi-user interference is removed.

While a receiving end according to the related art includes a ZF receiver and a modulo device, a receiving end 120 of the transmitting/receiving apparatus according to the embodiment of the present invention includes an ML receiver 203, which is suggested in an appropriate shape in consideration of the effect of a MOD operation 101. In a BTHP system, a signal constellation per data stream is copied based on a MOD boundary due to the effect of the MOD operation 101, and is expanded infinitely. Accordingly, the receiving end of the transmitting/receiving apparatus according to the embodiment of the present invention constitutes a candidate symbol group that is appropriately expanded, and applies the ML receiving technique to the candidate symbol group to restore data from the received signals $r_1$ through $r_k$ 111.

Figure 3:
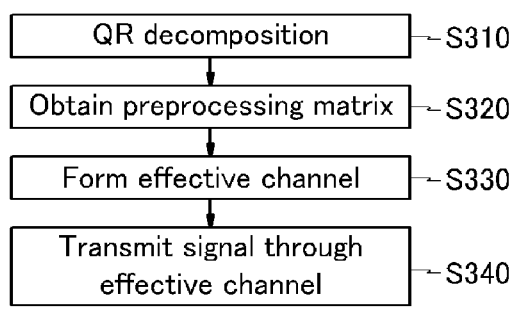
FIG. 3 is a flowchart illustrating a transmitting method according to an embodiment of the present invention.

Next, a transmitting method according to an embodiment of the present invention will be described with reference to FIG. 3. FIG. 3 is a flowchart illustrating a transmitting method according to an embodiment of the present invention.

The transmitting end 110 applies QR decomposition to the Hermitian transpose matrix of the entire user channel matrix (S310). If QR decomposition is applied to the Hermitian transpose matrix of the entire user channel matrix, a first matrix Q that has unit vectors orthogonalized to a preceding column vector in sequence starting with a first column vector of a decomposed matrix by a Gram-Schmidt orthogonalization technique, and a second matrix R as a triangular matrix, can be obtained. At this time, the column vectors of the first matrix may be orthogonal basis vectors constituting the entire channel space, and the column vectors corresponding to the individual users may be orthogonal basis vectors of a channel space orthogonalized in a user unit.

The transmitting end 110 obtains a preprocessing matrix by using the first matrix (S320). The first matrix is defined according to the number of receiving antennas of each user, as expressed by Equation 7.

$$Q = [Q_1 Q_2 \ldots Q_K] \quad \text{(Equation 7)}$$

Here, K denotes the number of users.

Then, the preprocessing matrix $Q_k'$ of the k-th user is as expressed by Equation 8.

$$Q'_k = Q_k T_k \quad \text{(Equation 8)}$$

Here, $T_k$ denotes an arbitrary complex rotation matrix and has a unitary characteristic.

The transmitting end 110 forms an effective channel based on the preprocessing matrix by the block triangulation technique of BTHP (S330), and transmits data through the effective channel (S340).

The elements of the effective matrix depend on the correlation between the orthogonal vectors and the channel vectors. Accordingly, if the basis vectors constituting the orthogonalized channel space of each user are distorted within the corresponding space to constitute the preprocessing matrix, a block triangular effective channel for BTHP can be formed.

The modulo operation which is used in THP to constrain transmission power of the transmission signal, from witch an interference signal is removed in advance, can infinitely copy and expand the primitive constellation of a modulation technique to be used. Accordingly, the ML receiver that finds a vector having high probability to be closest to the received signal from among all the possible signal vectors theoretically has infinite complexity. However, there is little probability that, after a vector distant from the inversely transformed received signal undergoes the channel, a channel closest to the received signal occurs. Actually, if such a channel occurs, the decision boundary of the receiver is reduced and becomes relatively sensitive to noise. For this reason, there is less probability that correct selection is made. Accordingly, only if the ML receiving technique is used for the signal vectors in the equivalent constellation groups of two layers based on the inversely transformed received signal can substantially optimum performance be accomplished. This is similar to the operation principle of a sphere decoder (SD). When the SD technique is actually applied, the complexity can be significantly reduced.

When the transmission signals are received while being mixed in the multiple-input multiple-output channel, the ML receiver detects the transmission signals in a vector unit. That is, the ML receiver is less sensitive to a channel path of a low gain or inter-path correlation. Accordingly, the ML receiver has excellent performance, compared with other receiving techniques. In a single-input single-output channel that is optimized to detect the signals in a symbol unit, such a gain cannot be obtained. Therefore, in the existing SO technique that constitutes an effective multiple-input multiple-output channel of each user as an equivalent single-input single-output channel, even if the ML receiving technique is applied, the gain cannot be obtained.

The transmitting method according to the embodiment of the present invention can obtain a spatial diversity gain of ML by forming an unparalleled Rayleigh channel. In order to form the Rayleigh channel, the elements of the effective channel independently have the normal distribution with an average of "0". Since dispersion is related to the gain of the channel, the elements preferably have the same dispersion within the effective channel of each user.

The average and the correlation of the elements in the arbitrary complex rotation matrix expressed by Equation 8 are zero (0). The average of the elements of the effective channel in the transmitting method according to the embodiment of the present invention is defined by the sum of products of the average of the elements in the arbitrary complex rotation matrix. The correlation of the elements of the effective channel in the transmitting method according to the embodiment of the present invention is defined by the sum of products of the correlation of the elements in the arbitrary complex rotation matrix. The elements of the effective channel in the transmitting method according to the embodiment of the present invention are expressed by the sum of elements having the average "0". According to the central limit theorem, the elements of the effective channel in the transmitting method according to the embodiment of the present invention follow the normal distribution of the average "0", have no correlation, and have the same dispersion. Therefore, in the transmitting method according to the embodiment of the present invention, if a BTHP system to which the receiver from the ML point of view is constructed in the effective channel, the error performance can be improved according to the spatial diversity gain, unlike the existing system.

Figure 4:
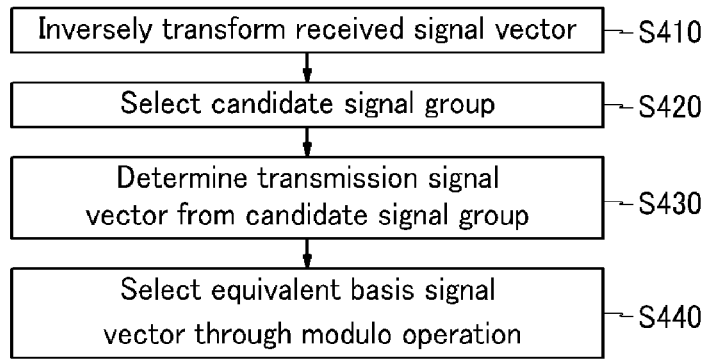
FIG. 4 is a flowchart illustrating a transmission method according to an embodiment of the present invention.
Figure 5:
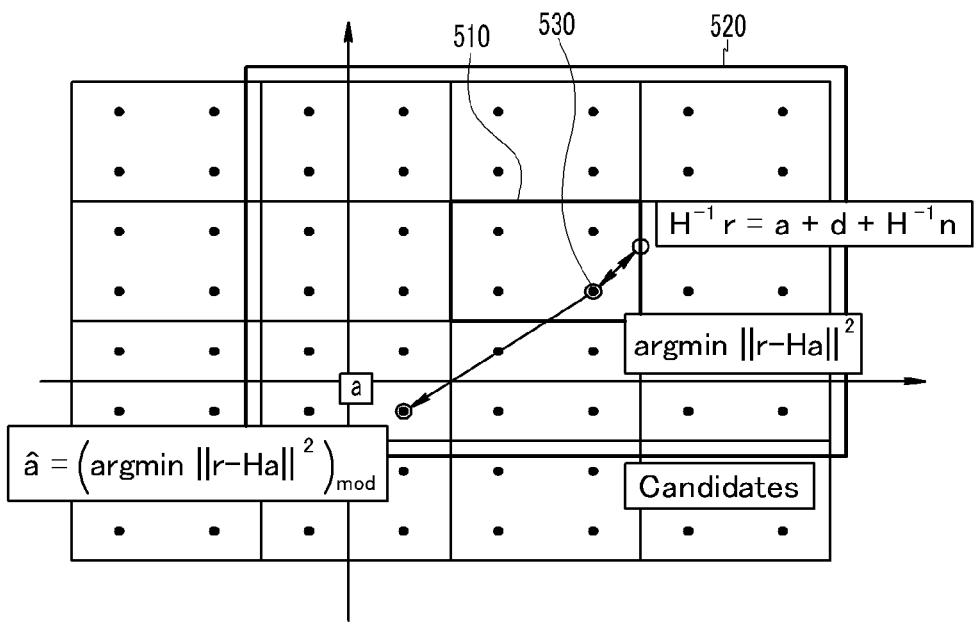
FIG. 5 is a diagram illustrating a method of finding a transmission signal vector in a modulo-expanded constellation.

Next, a receiving method according to an embodiment of the present invention will be described with reference to FIGS. 4 and 5. FIG. 4 is a flowchart illustrating a transmission method according to an embodiment of the present invention, and FIG. 5 is a diagram illustrating a method of finding a transmission signal vector in a modulo-expanded constellation.

The receiving end 120 inversely transforms the received signal vector by using the inverse matrix of the channel (S410). The received signal vector r is as expressed by Equation 9.

$$r = H(a+d) + n \quad \text{(Equation 9)}$$

Here, the vector a denotes a transmission signal vector, and the vector d denotes a code vector that is added by the modulo device at the transmitting end. In addition, the vector H denotes a channel matrix, and the vector n denotes a noise vector.

If the received signal vector r is inversely transformed, Equation 10 is obtained.

$$H^{-1}r = a + d + H^{-1}n \quad \text{(Equation 10)}$$

As shown in FIG. 5, based on a constellation 510 in which the inversely transformed received signal vector exists, the receiving end 120 selects a constellation group 520 of a single layer surrounding the constellation 510 as a candidate signal group of the ML receiver (S420).

The receiving end 120 finds a transmission signal vector closest to the received signal vector from the candidate signal group (S430).

As shown in FIG. 5, if a candidate signal group is A, a transmission signal vector 530 closest to the received signal vector is as expressed by Equation 11.

$$\underset{a \in A}{\mathrm{argmin}} \|r - Ha\|^2 \qquad \text{(Equation 11)}$$

The receiving end 120 performs the modulo operation on the transmission signal vector closest to the received signal vector and selects an equivalent basis signal vector (S440). The equivalent basis signal vector is as expressed by Equation 12.

$$\hat{a} = \left(\underset{a \in A}{\mathrm{argmin}} \|r - Ha\|^2\right)_{mod} \qquad \text{(Equation 12)}$$

The receiver from the ML point of view can be used in the BTHP system through the receiving technique.

Hereinafter, the performance of the transmitting/receiving method according to the embodiment of the present invention will be described with reference to FIGS. 6 to 8.

For estimation of the performance of the transmitting/receiving method according to the embodiment of the present invention through comparison with the performance of the transmitting/receiving method according to the related art, a simulation was executed while the number of antennas was changed. The transmitting/receiving method according to the embodiment of the present invention can be applied to a case in which each user has a different number of receiving antennas, but for convenience of explanation, it is assumed that each user has the same number of antennas. It is also assumed that the number of data streams to be simultaneously transmitted to each user is the same as the number of receiving antennas of the user, and the number of transmitting antennas of the base station is more than or equal to the total number of receiving antennas of all the users. ($N_T$, $N_R$, K) means a system in which a base station having $N_T$ transmitting antennas supports K users each having $N_R$ receiving antennas. It is also assumed that the elements of the channel matrixes of all the users independently have the same normal distribution of the average "0" and the dispersion "1". In this case, a 4QAM modulation scheme is used, and the average transmission power of each user is 1/K.

Figure 6:
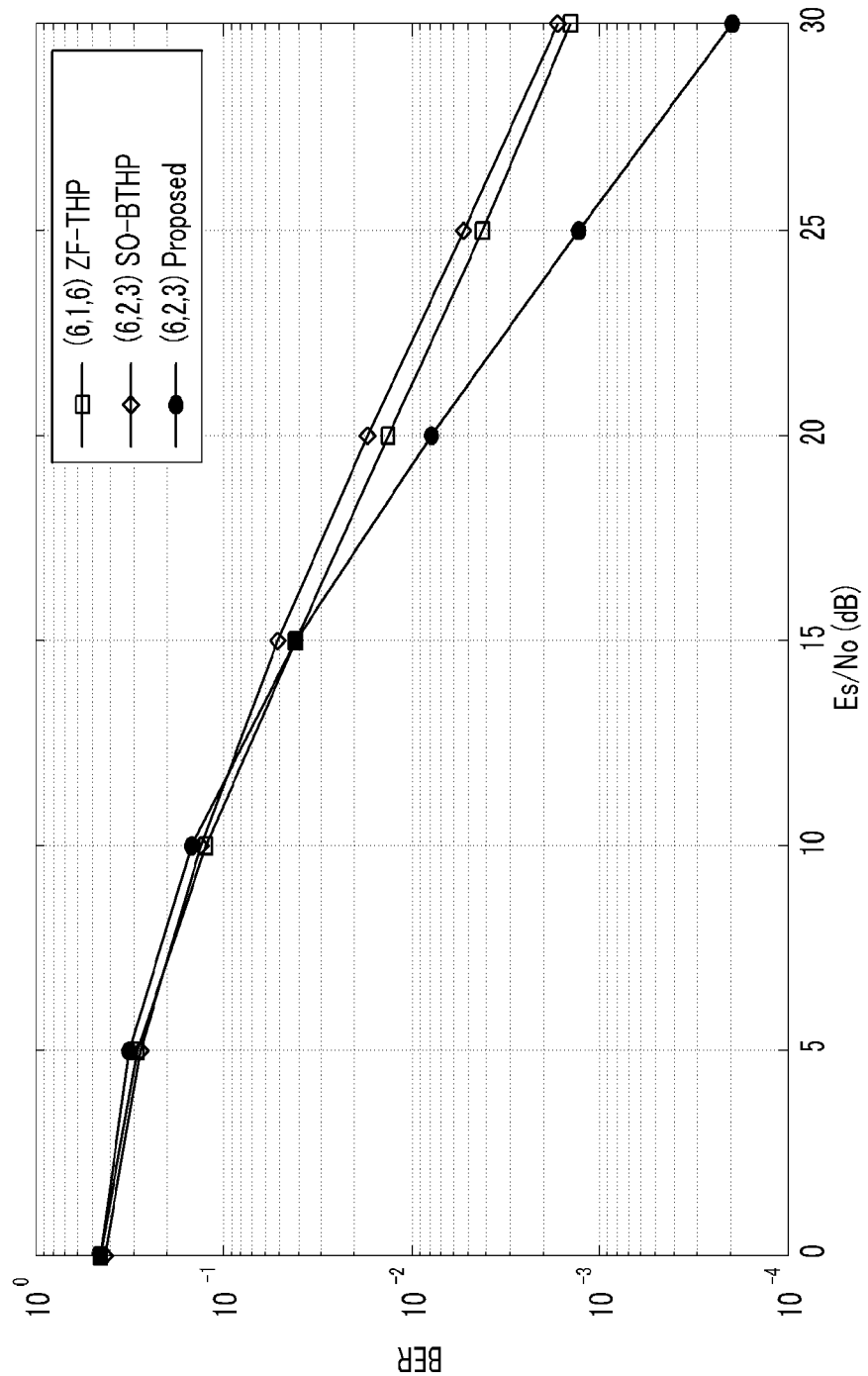
FIG. 6 is a diagram illustrating the average bit error rate (BER) performance of users according to a signal-to-noise ratio when the number of transmitting antennas is 6 and three users each having two receiving antennas are present.

FIG. 6 is a diagram illustrating the average bit error rate (BER) performance of users according to a signal-to-noise ratio when the number of transmitting antennas is 6 and three users each having two receiving antennas are present. Since ZF THP is a system that supports a user having a single antenna, an experiment was made in (6, 1, 6) in order to adjust the total data rate. Referring FIG. 6, it can be seen that the SO-BTHP system can transmit, to a user, data two times more than the ZF THP system, but in view of the error performance, a loss occurs. In contrast, a system to which the transmitting/receiving method according to the embodiment of the present invention is applied can obtain the spatial diversity gain by using a multiple-antenna of each user while transmitting multiple data streams. Accordingly, this system has excellent error performance, compared with the ZF THP system and the SO-BTHP system.

Figure 7:
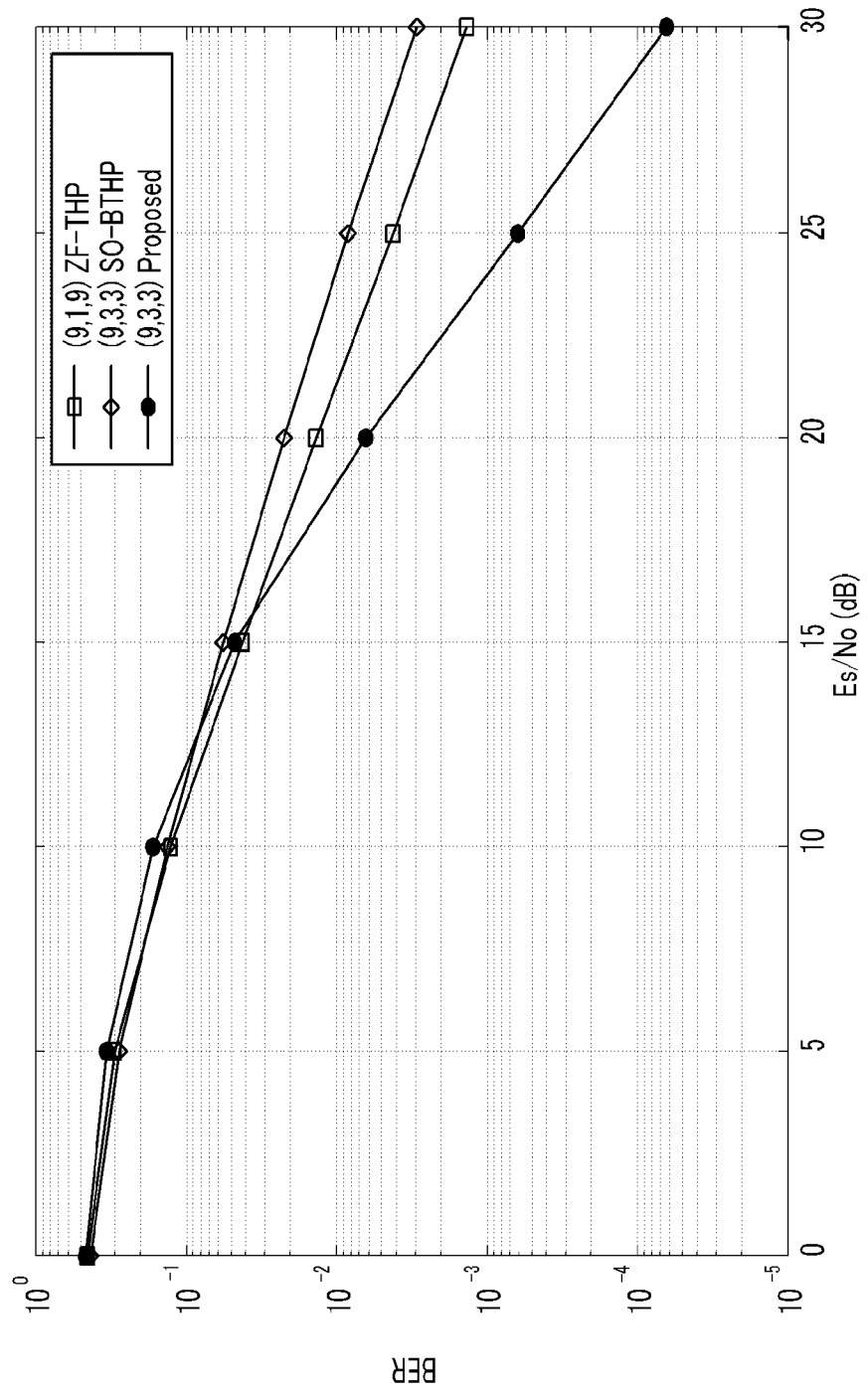
FIG. 7 is a diagram illustrating the average BER performance of users according to a signal-to-noise ratio when the number of transmitting antennas is 9 and three users each having three receiving antennas are present.

FIG. 7 is a diagram illustrating the average BER performance of users according to a signal-to-noise ratio when the number of transmitting antennas is 9 and three users each having three receiving antennas are present. Since ZF THP is a system that supports a user having a single antenna, an experiment was made in (9, 1, 9) in order to adjust the total data rate. As shown in FIG. 7, in the case of SO-BTHP that supports multiple data stream transmission, since a ZF receiver is used, as the number of antennas of each user is increased, the error performance is gradually deteriorated. In contrast, the system to which the transmitting/receiving method according to the embodiment of the present invention is applied can further obtain the spatial diversity gain. Therefore, even if each user transmits more data with the same transmission power, this system has excellent error performance.

Figure 8:
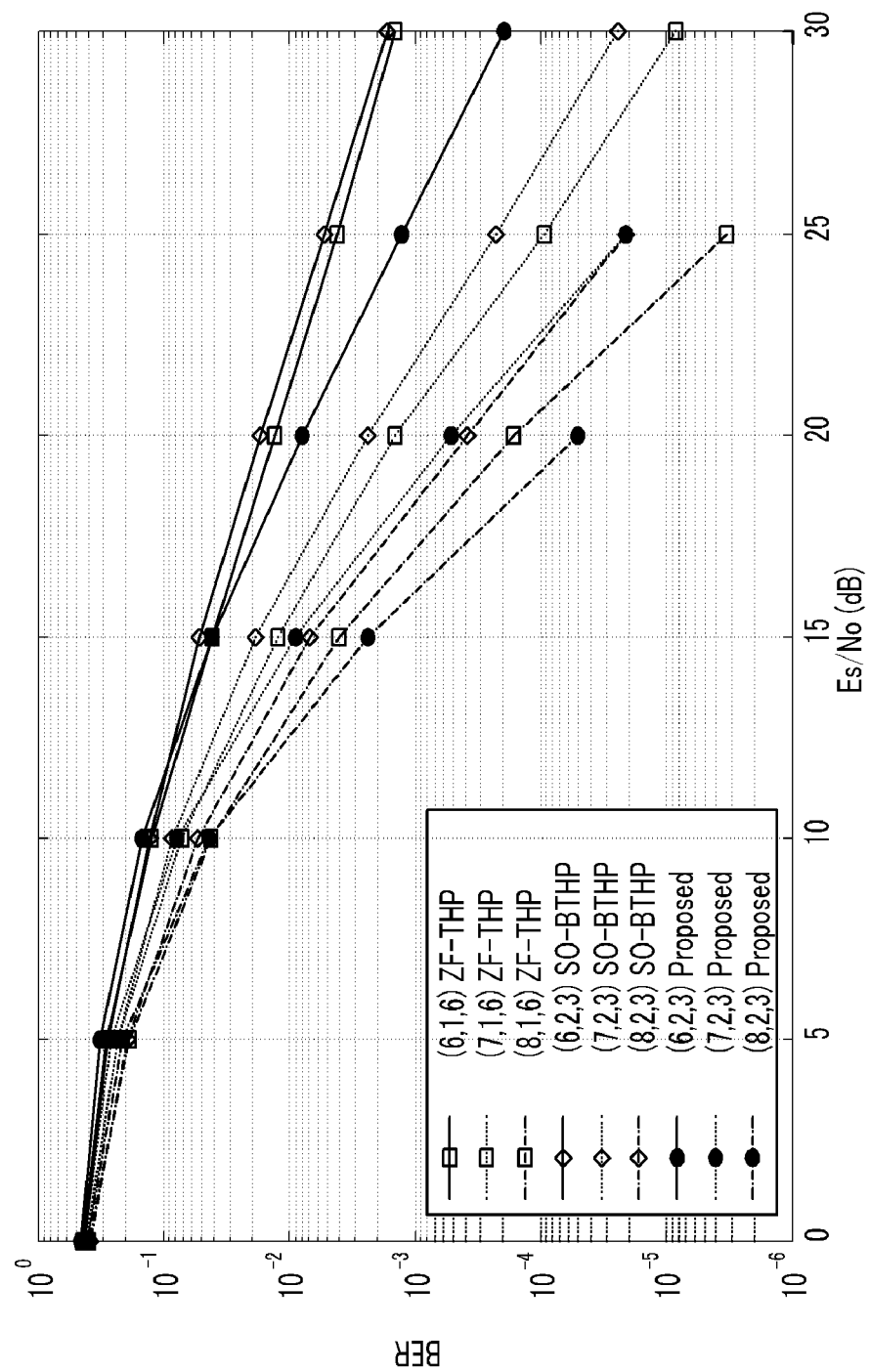
FIG. 8 is a diagram illustrating the average BER performance of users when the number of transmitting antenna is increased while the number of receiving antennas is fixed.

FIG. 8 is a diagram illustrating the average BER performance of users when the number of transmitting antennas is increased while the number of receiving antennas is fixed. Since ZF THP is a system that supports a user having a single antenna, an experiment was made in (6, 1, 6), (7, 1, 6), and (8, 1, 6) in order to adjust the total data rate. Referring to FIG. 8, in any one of the three methods, it can be seen that as the number of transmitting antennas is increased, rapid performance improvement is observed, and a difference in performance of the three methods is maintained.

The embodiment of the present invention described above is not be implemented by only the method and apparatus, but it may be implemented by a program for executing the functions corresponding to the configuration of the exemplary embodiment of the present invention or a recording medium having recorded thereon the program. These implementations can be realized by the ordinarily skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A transmitting method for a Multi-User Multiple-Input Multiple-Output (MU-MIMO) system, the transmitting method comprising:
   performing QR decomposition on a Hermitian transpose matrix of a channel matrix to obtain a first matrix and a second matrix as a triangular matrix;
   obtaining a preprocessing matrix by using the first matrix;
   forming an effective channel based on the preprocessing matrix by a block triangulation technique,
   wherein column vectors of the first matrix are orthogonal basis vectors; and
   wherein the preprocessing matrix is a product of the first matrix and a complex rotation matrix.

2. The transmitting method of claim 1, wherein the complex rotation matrix has a unitary characteristic.

3. The transmitting method of claim 1, wherein the first matrix is a matrix that includes unit vectors that are orthogonalized to a preceding column vector in sequence starting with a first column vector.

4. The transmitting method of claim 1, wherein the elements of the effective channel follow a normal distribution of an average "0" and have no correlation.

5. The transmitting method of claim 1, wherein the elements of the effective channel have a same dispersion.

6. A transmitting method for a Multi-User Multiple-Input Multiple-Output (MU-MIMO) system, the transmitting method comprising:

performing QR decomposition on a Hermitian transpose matrix of a channel matrix to obtain a first matrix and a second matrix as a triangular matrix;

obtaining a preprocessing matrix by using the first matrix;

forming an effective channel based on the preprocessing matrix by a block triangulation technique, wherein column vectors of the first matrix are orthogonal basis vectors; and wherein the orthogonal basis vectors constitute an entire channel space.

7. The transmitting method of claim 6, wherein the preprocessing matrix is a product of the first matrix and a complex rotation matrix.

8. The transmitting method of claim 7, wherein the complex rotation matrix has a unitary characteristic.

9. The transmitting method of claim 6, wherein the first matrix is a matrix that includes unit vectors that are orthogonalized to a preceding column vector in sequence starting with a first column vector.

10. The transmitting method of claim 6, wherein the elements of the effective channel follow a normal distribution of an average "0" and have no correlation.

11. The transmitting method of claim 6, wherein the elements of the effective channel have a same dispersion.

* * * * *